United States Patent [19]

Cheer

[11] Patent Number: 4,523,780
[45] Date of Patent: Jun. 18, 1985

[54] TUBE JOINT

[75] Inventor: David A. Cheer, Reading, England

[73] Assignee: J.P. Products, Inc., Blue Bell, Pa.

[21] Appl. No.: 435,916

[22] Filed: Oct. 22, 1982

[30] Foreign Application Priority Data

Apr. 2, 1982 [GB] United Kingdom ............... 8209871

[51] Int. Cl.³ .............................................. F16L 55/00
[52] U.S. Cl. ..................................... 285/399; 285/424; 285/DIG. 22
[58] Field of Search ............... 285/399, DIG. 22, 424, 285/304, 7, 423, DIG. 4

[56] References Cited

U.S. PATENT DOCUMENTS

| | | | |
|---|---|---|---|
| 337,589 | 3/1886 | Knapp | 285/399 X |
| 898,510 | 9/1908 | Schlafly | 285/424 X |
| 2,650,114 | 8/1953 | Epstein | 285/424 X |
| 3,413,021 | 11/1968 | Potts | 285/424 X |

FOREIGN PATENT DOCUMENTS

| | | |
|---|---|---|
| 2100952 | 7/1962 | Fed. Rep. of Germany ... 285/DIG. 4 |
| 621254 | 4/1949 | United Kingdom . |
| 928911 | 6/1963 | United Kingdom ....... 285/DIG. 22 |
| 1144358 | 3/1969 | United Kingdom . |
| 2006297 | 5/1979 | United Kingdom . |
| 1586738 | 3/1981 | United Kingdom . |

*Primary Examiner*—Dave W. Arola
*Attorney, Agent, or Firm*—John W. Logan, Jr.

[57] ABSTRACT

There is provided a tube end configuration for joining two hollow tubes end to end, the novel joint comprising a tapered end on one tube, which end fits into the untapered end of another tube forming a variable length tubular pipe. The untapered tube end has one or more protrusions (ridges) extending inwardly from its inner wall while the tapered end has one or more complementing indentations (recesses) extending inwardly from its outer wall. The ridges engage the recesses when the tubes are joined together. One or both of the tubes also have several longitudinally aligned slots located within the tube ends that overlap whereby spring leaves are defined which can flex resiliently to allow the ridge(s) to ride over the taper and fixedly lodge in the recess(es) as the tubes are slid together.

3 Claims, 1 Drawing Figure

U.S. Patent    Jun. 18, 1985    4,523,780
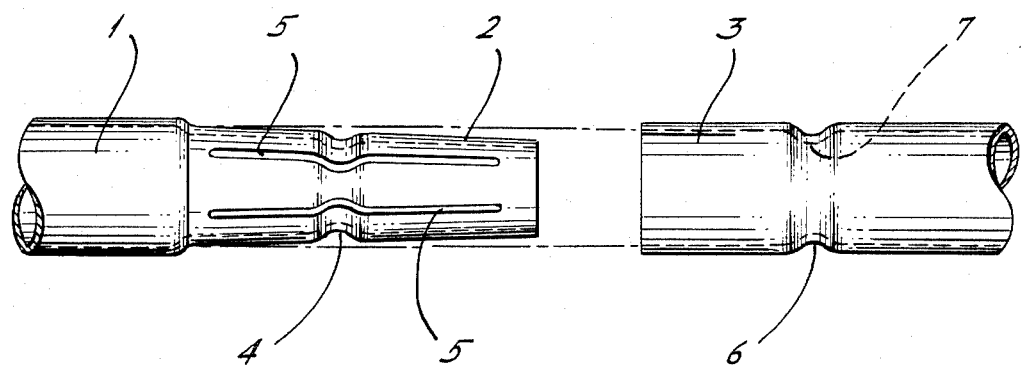

TUBE JOINT

CROSS REFERENCE TO OTHER APPLICATIONS

The disclosure corresponds to a patent specification filed in Great Britain on the 2nd of April 1982, under No. 8209871, which was published as U.K. Patent Application No. 2,117,856A, on 19 October 1983, and titled "Tube Joint".

The invention relates to a hollow tube adapted to be formed into a variable length tubular pipes. In one aspect, it relates to a tube with novel end configurations to faciliate plural joining of tube sections.

In the past, multi-part rods or tubes have been formed by push-fitting a reduced end of one tube into the open end of the next tube section. Generally, the tubes are then held together merely by friction and subject to accidental displacement. However, it is also possible to incorporate coil springs within the tubes so that the springs tend to draw the tubes together. An object of the present invention is to provide an improved joint.

Another object is to provide extendable tubular lengths which maintain their integrity in use but are detachable upon manual handling.

According to the invention, there is provided a tube end configuration for joining two tubes end to end, the novel joint comprising a tapered end on one tube, which end fits into the untapered end of another tube.

The joint serves for linking first and second hollow tube sections in axial alignment and comprises a first tube section having one end portion of substantially uniform diameter, an inwardly directed ridge formed circumferentially and proximate that end of said first tube section, a second tube section having an end portion with a substantially uniform taper that decreases the tube diameter toward that end of said tube section. The tapered end is adapted to be received within the untapered end portion of the first tube section.

Also provided is an inwardly directed recess formed circumferentially about the end portion of the second tube section to receive the inwardly directed ridge of the first tube section end portion and interlock the tubes together.

A preferential feature is a plurality of longitudinal slots formed within the end portion of at least one of said tube sections, and extending on either side of the ridge (recess) portion thereof. These slots define resilient spring leaf sections therein, which leaves will deform as the tubes sections are joined, so as to permit the inward ridge portion of one tube section to engage securely within the inward recess portion of the other tube section. The slots are preferentially included in the tapered end portion.

By "longitudinal" is meant that the slots are substantially parallel with the tube axis, although the slots may be skewed to some extent.

The invention relates to a novel joint for detachably joining tubes end to end.

Particular application for the invention is found in detachable multi-part rods or tubes such as for radio aerials, fishing rods, tent poles or the like.

Although the ridges and/or recesses may be discontinuous, thus providing rotational location as well as longitudinal location, it is preferred that the indentations are constituted as a continuous grooved recess in the tapered end, and the protrusions are constituted as a continuous ridge within the end of the other tube. This ridge may be included by deforming the tube wall by rolling a groove from the outside surface.

The longitudinal slots should extend on both sides of (beyond) the recesses or ridges, because that is the position where maximum deflection is obtained upon mating of tube sections.

There are no slots needed in the other untapered tube end, the slots being formed only in the tapered end of the said one tube. There are at least two opposing slots and while there may be as few as three, there are preferably four slots radially aligned for uniform compression. The number and dimensions of the slots, the degree of taper, and the size of the protrusions and indentations will be readily chosen by those skilled in the art, and depend upon the materials of which the tubes are made and type of service.

The invention is applicable to tubes made of any suitable material, even such as formed rigid plastics. However, the principal application of the invention is to be found in metal tubes, and in a preferred embodiment of the invention, an auto radio aerial is made of such tubes which are made of beryllium-copper alloy.

A preferred embodiment of the invention will now be described with reference to the accompanying drawing, the sole FIGURE of which is an elevational view of the opposing tube section ends configured in accordance with the invention.

Referring now to the drawing, there is shown a first tube 1 which is swaged, as is well known in the metal shaping arts, to form a tapered end 2. This is to be joined to a second tube 3 which has an essentially cylindrical and untapered end.

A groove 4 which constitutes an indentation and untapered recess is rolled into the tapered end 2 and four slots 5 (of which only two are shown in the drawing) are cut in the tube wall. Each slot is closed at both ends within the tapered portion.

A groove 6 is rolled into untapered end 3 so as to provide a continuous annular ridge 7 protruding from the inside wall of the tube.

The configuration is such that when the tapered end 2 is inserted into end tube 3, ridge 7 engaged with the taper, and as the tubes are pressed together, this briefly deforms the tapered end by pressing inwardly slightly the leaves defined by the parallel slots 5. Because of the choice of the material, these leaves constitute resilient springs; and when the ridge 7 is pushed far enough in so as to engage recess 4, the leaves spring back to normal position, so as to hold the tube ends firmly together with the ridge 7 engaged in the recess 4.

Clearly, for a multi-section tube, each section will be identically formed at one end with a tapered end 2, and at the other with a receiving end 3, such as is shown in the drawing.

The invention is not restricted to the details of the embodiment described above with reference to the drawing. For example, slots may be formed in the outer tube as well as, or instead of, the inner tube.

Other variations and modifications within the state of the art may become apparent without departing from the scope and spirit of my invention.

I claim:

1. A joint for linking first and second hollow ridge tube sections in axial alignment to form a continuous tube of substantially uniform diameter, comprising:
   (a) a first tube section having one end portion of substantially uniform diameter;

(b) an inwardly directed continuous ridge formed circumferentially of said one end portion and spaced a predetermined distance from said one end of said first tube section;

(c) a second tube section having one end portion commencing with an abrupt decrease in outside diameter and tapering uniformly from the abrupt diameter decrease to the end of said second tube section, the tapered end being adapted to be received within said one end portion of said first tube section;

(d) an inwardly directed continuous recess formed circumferentially about the tapered end portion of said second tube section and spaced from the start of the taper at said abrupt diameter decrease a distance equal to the spacing of said inwardly directed ridge from said one end of said first tube section, said circumferential recess adapted to receive the inwardly directed ridge of said first tube section end portion and interlock said tubes together; and (e) a plurality of uniformly spaced longitudinal slots formed in the tapered end portion of said second tube section extending on either side of and through the recess therein, said longitudinal slots terminating short of the end of said second tube section and short of the end of said tapered section adjacent said abrupt diameter decrease, forming in said tapered section resilient spring leaf sections which deform as the tube's sections are joined to permit the inward ridge portion of said one tube section to engage securely within the inward recess portion of said second tube section.

2. The joint of claim 1 wherein said recess is disposed at approximately the midpoint of said tapered end.

3. A joint for linking first and second tube sections in axial alignment in accordance with claim 1, in which the tapered end of said second tube section at a point adjacent the abrupt diameter decrease of said second tube section has an outside diameter substantially equal to the inside diameter of said first tube section.

* * * * *